March 5, 1968  S. S. BOARD, JR., ET AL  3,371,450
APPARATUS FOR BALANCING ROTATING BODIES
Filed Oct. 13, 1965  4 Sheets-Sheet 1
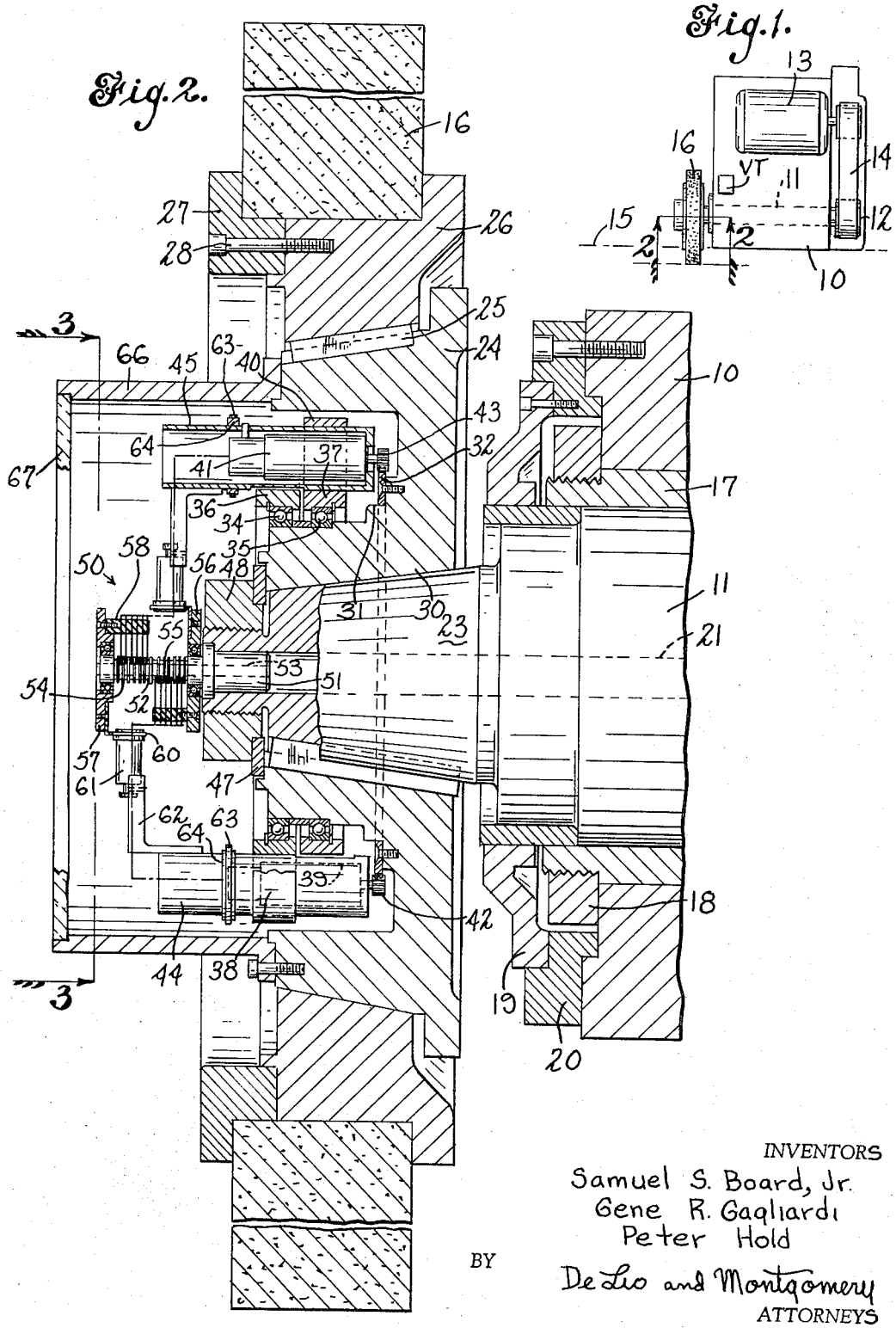
INVENTORS
Samuel S. Board, Jr.
Gene R. Gagliardi
Peter Hold
BY De Lio and Montgomery
ATTORNEYS

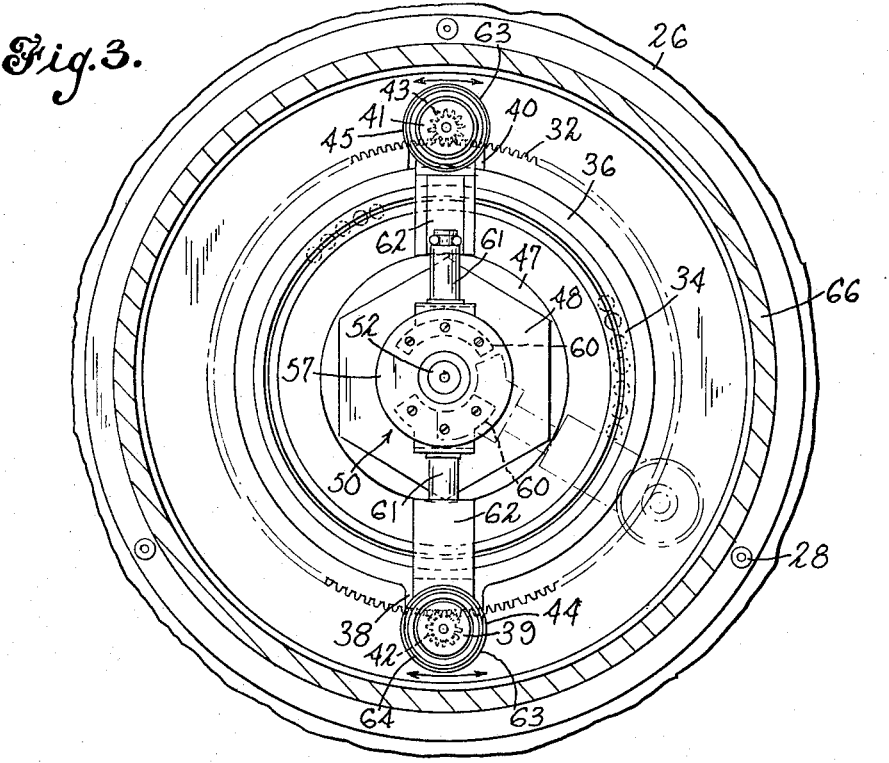
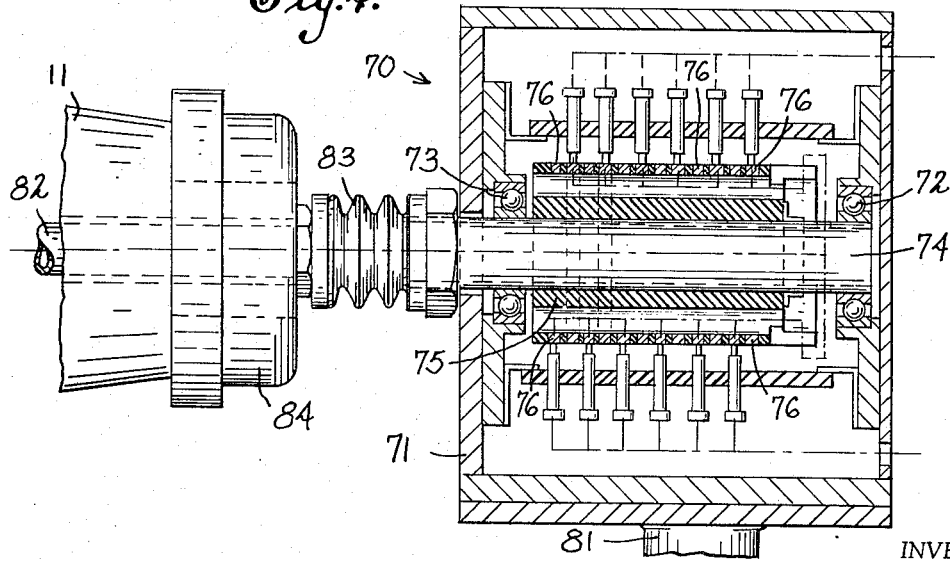

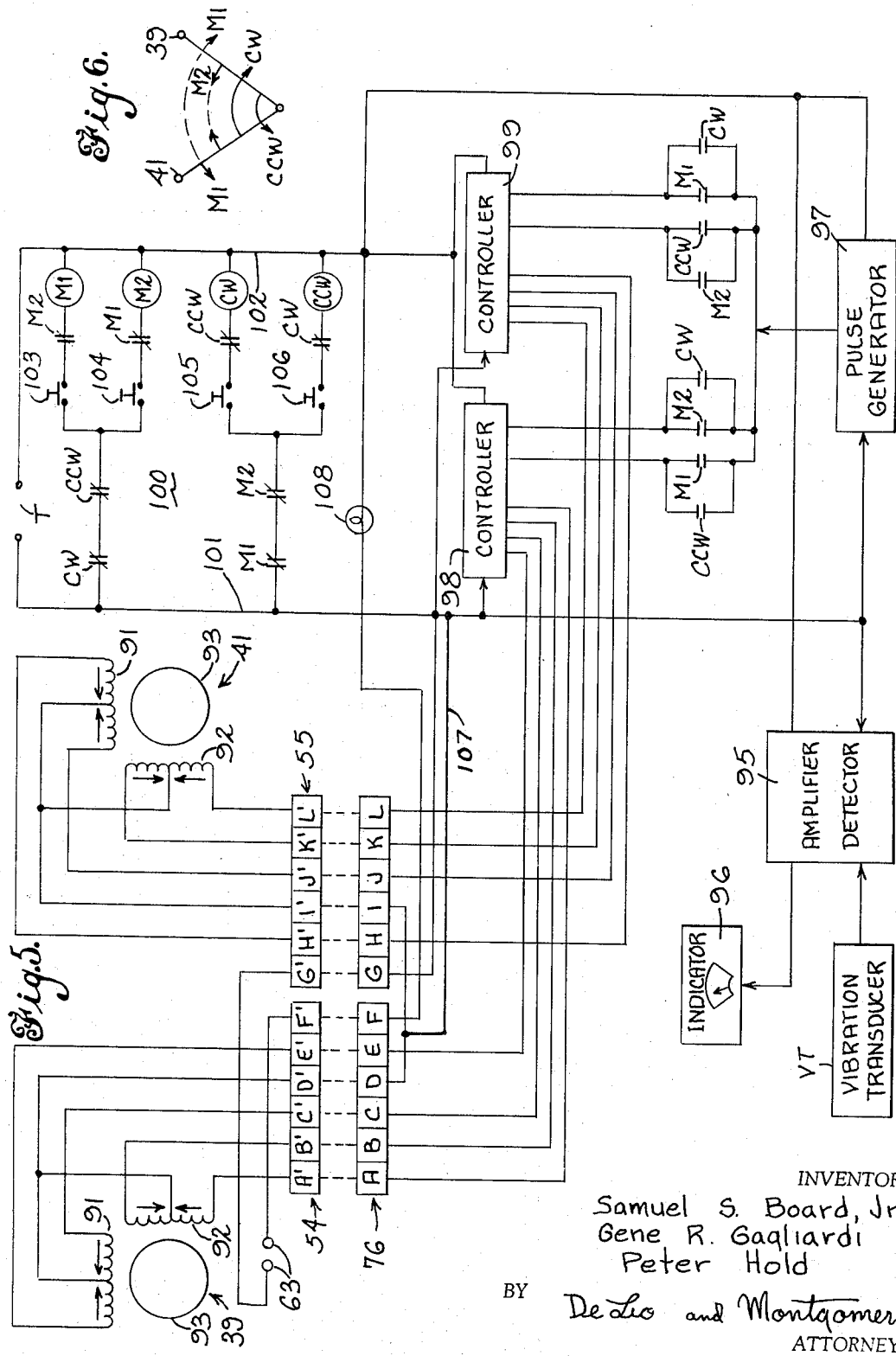

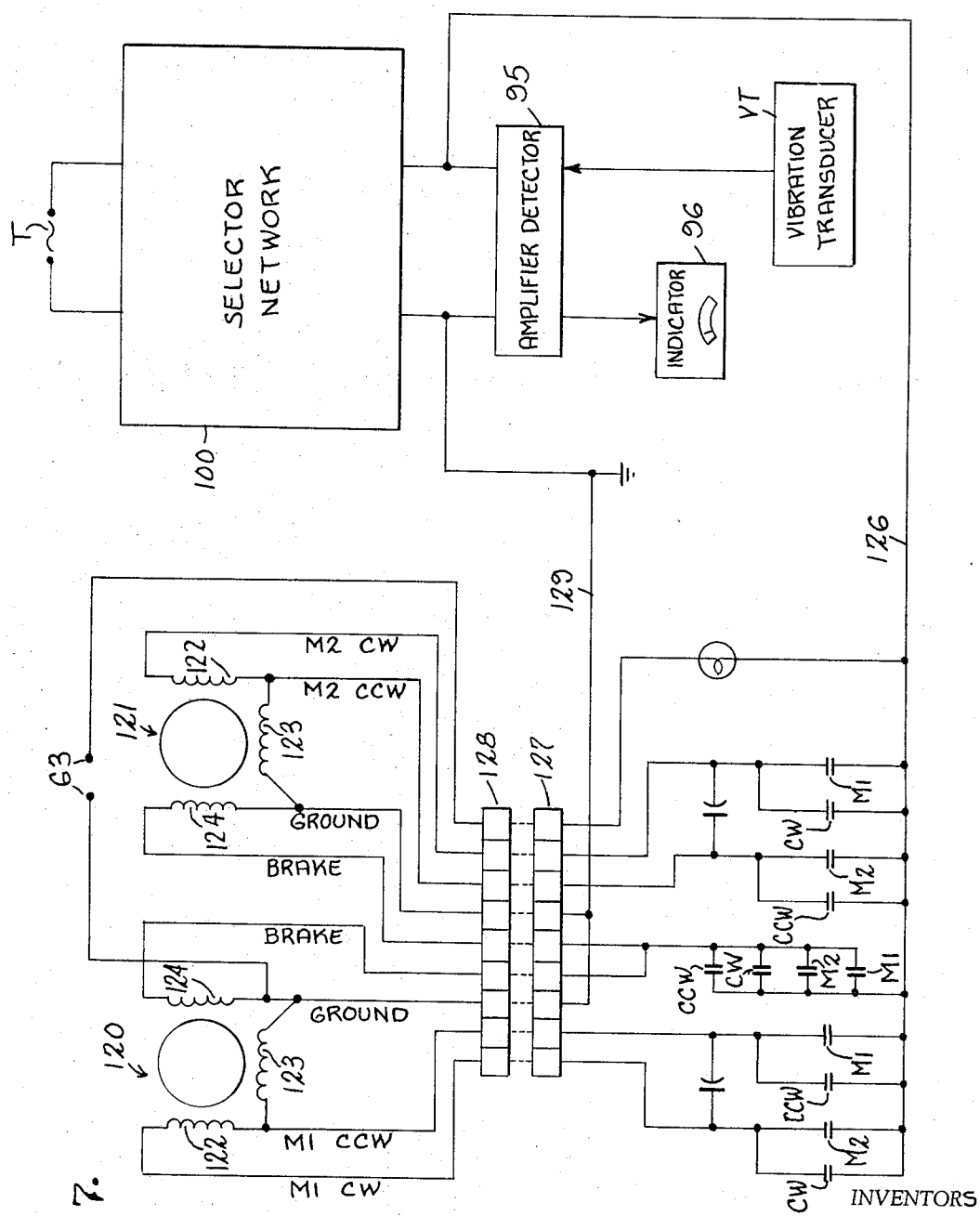

United States Patent Office 3,371,450
Patented Mar. 5, 1968

3,371,450
APPARATUS FOR BALANCING
ROTATING BODIES
Samuel S. Board, Jr., Woodbridge, Gene R. Gagliardi, Bethany, and Peter Hold, Milford, Conn., assignors to Farrel Corporation, Ansonia, Conn.
Filed Oct. 13, 1965, Ser. No. 495,569
17 Claims. (Cl. 51—169)

This invention relates to apparatus for balancing rotating bodies, and more particularly relates to apparatus for balancing bodies which rotate about a predetermined axis.

In bodies designed for rotation, such as grinding wheels, there is always some inherent imbalance which is manifest by vibrations and oscillations of the body and/or its mounting means upon rotation. It is recognized that such bodies may be dynamically balanced by creating a vector force which is equal in magnitude, but opposite in direction, to the force set up by the inherent imbalance. In the case of a rotating tool, such as a grinding wheel, this has been accomplished by providing two balancing masses which rotate with the grinding wheel but which are positionable with respect thereto so as to provide a resultant vector force between the balancing masses. The magnitude of the balancing forces is determined by the angle defined between the balancing masses, as well as the masses themselves and may be increased by moving the masses toward each other and decreased by moving the masses apart to increase the angle therebetween.

This general balancing concept has been known for many years and many different mechanisms have been proposed and devised to move or position the balancing masses. Such mechanisms have comprised various forms of balancing masses which may or may not have a connection or support extending from the center of rotation of the body to be balanced, together with apparatus to effect movement and positioning of the masses. In some cases, the balancing masses have comprised elements in an annular guideway which are clamped in position in the guideway and released to seek a balancing position in the guideway when unbalance is detected. These known structures have required rather complex mechanisms for effecting control of the balancing masses, or clutching and clamping devices, and have further required some power means for actuating such mechanisms, if such mechanisms are not adapted for hand manipulation. Furthermore, the known balancing apparatuses have been rather bulky and do not readily lend themselves for mounting on the rotating mass in the available space.

The present invention provides a new and improved balancing apparatus especially for grinding wheels which is compact in arrangement and is readily mountable on a rotating body, as on the hub of a grinding wheel collar. The invention further provides a balancing apparatus wherein the means for positioning the balancing masses also provide the balancing masses to further lend to the compactness of the device.

Briefly stated, the invention in one form thereof, comprises a grinding wheel support member having provided in the hub thereof a mechanism which includes a pair of balancing masses in the form of controllable motors which are rotatable about the axis of rotation of the grinding wheel in a predetermined circle. Such motors provide the balancing masses, and also the motive power therefor. Control means are further provided for positively moving each motor to effect dynamic balance of the overall assembly.

Accordingly, an object of this invention is to provide a new and improved balancing apparatus for rotating bodies.

Another object of this invention is to provide a new and improved balancing apparatus for grinding wheels.

Another object of this invention is to provide a new and improved apparatus for balancing rotating bodies which is compact in size and simplified in structure wherein the balancing masses are self-propelled along a predetermined path.

Another object of this invention is to provide a new and improved apparatus for balancing rotating bodies using motor controlled balancing masses where the motors also are the balancing masses.

A further object of this invention is to provide a balancing means for rotating bodies including new and improved control means for effecting positive control of movement of the balancing masses.

The features of the invention which are believed to be novel are particularly pointed out and distinctly claimed in the concluding portion of this specification. However, the invention both as to its organization and operation, together with further objects and advantages thereof, may best be appreciated by reference to the following detailed description of a preferred embodiment thereof taken in conjunction with the drawings, in which:

FIG. 1 is a plan view of the grinding head of a grinding machine;

FIG. 2 is a view seen in the plane of line 2—2 of FIG. 1;

FIG. 3 is a partial sectional view seen in the plane of lines 3—3 of FIG. 2;

FIG. 4 is an elevation in half section of a slip ring assembly;

FIG. 5 is a diagram, partly schematic and partly diagrammatic of a motor control system;

FIG. 6 is a diagrammatic illustration of balancing masses for a rotating body set forth to aid in explanation of the operation of the mechanism of FIG. 2 in conjunction with the control system of FIG. 5; and FIG. 7 is a schematic diagram, similar to FIG. 5, of another control system.

A grinding head which embodies the invention may comprise a housing 10 rotatably mounting a spindle 11 therein which has a pulley 12 driven by a motor 13 through a belt 14 or other suitable connection. The housing 10, as is well known to those skilled in the art, is mounted for reciprocating movement on a base indicated by the broken line 15. A grinding wheel 16 is mounted on spindle 11 for rotation therewith.

Spindle 11 is rotatably mounted in housing 10 at the grinding wheel end thereof by a bearing sleeve 17 secured therein by a retaining nut 18. The spindle support assembly further includes a cover member 19 and a mounting adaptor member 20. Spindle 11 is further provided with a hollow tubular passage 21 centrally therethrough to receive a tube for purposes hereinafter described. The grinding wheel end 23 of the spindle is tapered and receives thereon the tapered bore of a mounting collar 24. Detachably secured to collar 24 as by means of a key 25 is a second collar 26 arranged to have grinding wheel 16 mounted thereon. Collar 26 includes a bolting flange member 27 which when secured to collar 26 as by means of bolts 28 locks grinding wheel 16 in the second collar 26. Collar 24 comprises a hub portion 30 having a shoulder 31 thereon. Non-rotatably mounted to collar 24 about shoulder 31 is a ring gear 32 having teeth about its outer periphery. Also positioned about hub 30 are two anti-friction bearing assemblies 34 and 35, each of which comprises an outer race and inner race, and bearing elements therebetween. The inner races of bearing assemblies 34 and 35 are non-rotatably mounted on hub 30. Non-rotatably mounted to the outer race of bearing assembly 34 is a ring-like balancing mass carrier 36, and non-rotatably mounted to the outer race of bearing assembly 35 is a similar ring-like carrier 37. Carrier 36 is formed with a holder portion 38, more clearly shown in FIG. 3, which carries therein a motor 39. Carrier member 37 is also formed with a holder portion 40 which carries therein a motor 41. Each of motors 39 and 41 has pinions 42 and 43, respectively, on shafts which meshingly engage with the teeth of gear 32. Motors 39 and 41 are supported in a generally cylindrical chamber 44 and 45, respectively, which are received in the mounting apertures of holders 38 and 40, respectively.

As will hereinafter be described, motors 39 and 41 may be energized and driven together with their associated carrier members about the periphery of gear 32. It may be noted that the center of gravity or mass of each of the motors resides within the outline of the grinding wheel.

The collar 24 with the grinding wheel 16 mounted thereon is retained on the spindle by means of a washer 47 and lock nut 48. Extending into passage 21 and mounted for rotation with spindle 11 is a slip-ring assembly generally indicated by the reference numeral 50 and comprising a shaft portion 51 within passage 21. Shaft portion 51 extends into shaft 52 of slip-ring assembly 50 and has defined therein a central passageway 53 communicating with passage 21 in spindle 11. The purpose of these passages is to receive wiring from the opposite end of the spindle, as will hereinafter be described. Carried on shaft 52 are two sets of slip-rings 54 and 55, each set comprising a plurality of slip-rings. Rotatably mounted about shaft 52 at either end thereof are flanges 56 and 57. Mounted to each of flanges 56 and 57 is a brush holder 58 carrying a plurality of brushes which make rubbing contact with slip-ring sets 54 and 55.

Electrical leads are taken from brushes to each of motors 39 and 41 as indicated by broken lines and will hereinafter be described schematically. Each of flanges 56 and 57 also has mounted thereto an L-shaped bracket 60 which carries a connector device 61 which is secured to another L-shaped bracket 62, in turn, secured to the motor-mounting chambers 44 and 45. Leads from each of the brush holders are taken through one of the connectors 61 to a respective motor. Mounted externally of each of chambers 44 and 45 are electrical contact rings 63 on insulators 64 which are adapted to make electrical contact with each other when the motors 39 and 41 are brought in such proximity that the contact rings 63 touch.

At this point it may be seen that the assembly thus far described is mounted wholly within the hub of the collar 24 and extends axially but a small distance beyond the periphery of the grinding wheel. To protect against dirt, cooling liquid, etc. a cover 66 may be mounted to collar 24 and provided with a circular cover plate or window 67.

In operation, when motors 39 and 41 are energized through the slip-ring assembly they will rotate in predetermined directions and drive themselves on gear 32 so as to revolve about the rotative axis of the grinding wheel 16 and its mounting assembly. Through control means, hereinafter described, motors 39 and 41 may be moved simultaneously in the same direction or in opposite directions. The motors are revolved about the axis of the grinding wheel to a position where they establish a resultant vector force which is equal and opposite to the center of unbalance of the grinding wheel and are operable as hereinafter described.

The function of the balancing device including the two motors is to position the motors as balancing masses so that the resultant unbalancing force acts along a line bisecting the angle between the motors. Then the angle between the motors is changed in equal increments from either side of the reacting force to vary the magnitude of the force so that it is equal in magnitude but opposite in direction to the unbalanced force produced by and at the center of mass of the unbalance. As will hereinafter be more fully described, in balancing, the operator sets the speed of the grinding wheel to the most sensitive known balancing point. Then the operator will cause the two balancing motors to rotate around the spindle axis towards or away from each other and he determines whether or not the amplitude of vibration is increasing or decreasing. If the operator notes the amplitude of vibration to be increasing he causes both motors to reverse their direction of travel until a minimum vibration level or amplitude is noted. The operator will then cause the motors to travel in the same direction. If the vibration amplitude increases he immediately reverses the direction. Then, when a minimum vibration amplitude is noted this will establish the line bisecting the angle between the balancing masses in an opposite direction to the center of unbalance of the grinding wheel. Then the operator will move the motors towards or away from each other to set the magnitude of the balancing force until a new zero or minimum vibration level is achieved.

In some instances it may be necessary to perform this series of operations a second time in order to get a very fine balance.

In accordance with the invention, control means are provided for effecting the above-described operation. The balancing motors may be of a digitally responsive type, that is, the motors produce a predetermined angle of shaft rotation for each pulse received. Such motors are often referred to as "digital stepping motors."

The pulley end of spindle 11, together with a connecting slip-ring assembly generally indicated by the reference numeral 70 is illustrated in FIG. 4. Slip-ring assembly 70 generally comprises a housing or frame 71 having bearing assemblies 72 and 73 supported at opposite ends thereof which in turn rotatably support a shaft 74. Mounted to shaft 74 is a slip-ring carrier member 75 having a plurality of slip-rings 76 spaced longitudinally along the length thereof. Housing 71 may be carried on the grinding wheel platform by means of a post 81 or other suitable support means. Electrical leads indicated by broken lines are connected to each of the brushes through the brush holders externally of housing 71, by means of a suitable receptable, not shown. The slip-rings are electrically connected by leads extending through a liner 82 in spindle 11 to the slip-ring sets 53 and 54 at the grinding wheel end through shaft 74 and a hollow connector 83. Connector 83 interconnects shaft 74 with the pulley end 84 of spindle 11.

The controls for motors 39 and 41 are schematically illustrated in FIG. 5. Each of the motors has two fields 91 and 92 energizable in opposite directions as indicated by the arrows to control the direction of rotation of the rotor 93. Motor 39 is energized through slip-ring set 54 and motor 41 is energized through slip-ring set 55, both from the leads through passage 21 from slip-rings 76. The control circuit further comprises a vibration transducer VT adapted to detect unbalance of the grinding wheel through the vibrations set up by such unbalance, a detector and amplifier 95 which detects the output of the transducer, amplifies such output and supplies a direct current voltage of a magnitude proportional to the degree of unbalance to an indicating device 96 illustrated as a meter. Vibration transducer VT may be mounted on the grinding wheel carriage 10 or other suitable location in proximity to the grinding wheel to detect oscillations due to unbalance of the wheel.

The control circuit further comprises a pulse generator 97 which continually generates a series of uniformly spaced pulses, motor controllers 98 and 99, and a selector network 100. The selector network 100 comprises bus lines 101 and 102 that are connected across and receive control power from terminals T. As hereinafter described, motors 39 and 41 may be energized to operate as follows:

(1) Both motors turn about spindle 11 counterclockwise (2) Both motors turn about spindle clockwise (3) The motors move towards each other, one clockwise and the other counter-clockwise, and (4) Both motors move away from each other reversing the direction given in item 3 above.

To move the motors toward each other, as viewed in FIG. 6 which schematically represents the motors rotatable about the axis of spindle 11, the pushbutton 103 is depressed which allows relay M1 to be picked up and close its associated contacts bearing the same reference numeral. Then, the outputs of controllers 98 and 99 are connected to the apropriate fields of motors 39 and 41 to produce clockwise motion of motor 39 and counter-clockwise motion of motor 41 as viewed in FIG. 6. The controllers are merely electrical connecting circuits which connect the output of pulse generator 97 through appropriate contacts M1, M2, CW, CCW, the predetermined fields of motors 91 and 92.

If the motors should be continued to be rotated towards each other until the contact rings 63 make contact, a circuit will be established from line 101, slip-ring G, slip-ring G', contact rings 63, slip-ring F', slip-ring F and through warning lamp 108 to line 102. Lamp 108 will then indicate to the operator that the motors are in contact and can be rotated no further towards each other.

Conversely, when pushbutton 104 is depressed, relay M2 is picked up and relay M1, as well as relays CW and CCW, are locked out. The M2 contacts are picked up and through controllers 98 and 99 the fields of motors 39 and 41 are so energized as to produce counter-clockwise rotation of motor 39 and clockwise rotation of motor 41 as viewed in FIG. 6.

In a similar manner, when pushbutton 105 is depressed, relay CW is picked up and relays M1, M2 and CCW are locked out. The contacts of relay CW are picked up and the fields of motors 39 and 41 so energized as to produce clockwise rotation of both motors 39 and 41, as viewed in FIG. 6. When pushbutton 106 is depressed, relay CCW is energized and relays M1, M2 and CW lock out and pulses from pulse generator 97 through controllers 98 and 99 are applied to fields of motors 39 and 41 to produce counter-clockwise rotation of both motors 39 and 41, as viewed in FIG. 6.

As previously mentioned, the motors 39 and 41 are digital stepping motors and have a predetermined degree of shaft rotation for each received pulse. Therefore, each motor will rotate through the same degree of angularity with respect to each pulse received.

In the network of FIG. 5 it will be noted that the center point of each of the fields 91 and 92 is connected to line 11, line 107 and slip-rings I' and D'. Thus, the motors will be energized for rotation in a predetermined direction dependent upon which of the contacts are closed between the pulse generator and the controllers. Thus, for example, if relay M1 is energized the lines connected to slip-rings B, B' and E and E' would complete a circuit from lines 101 and 107 with respect to motor 39 and the lines connected to slip-rings H, H' and K and K' would complete circuits to controller 99 from lines 101 and 107 and slip-rings H and H'.

The invention may also be practiced utilizing other types of motors, such as synchronous hysteresis motors which simplify the control circuitry. Such an arrangement is shown in FIG. 7 using synchronous hysteresis motors 120 and 121, each having fields 122 and 123 and a braking winding 124.

In FIG. 7 elements corresponding to those of FIG. 5 bear the same identifying reference numeral. The motors 120 and 121 are synchronous hysteresis motors such as Globe Industries type MC 60 cycle gear head motors. Energization of the fields 122 and 123 determines the direction of rotaion of the motors and winding 124 controls a motor shaft brake (not shown) which is actuated to brake the motor upon de-energization of the winding. Such braking mechanism is well known to those skilled in the art and need not be specifically disclosed herein.

Suffice it to say that when winding 124 is energized it magnetically releases the brake, and when the winding is de-energized it no longer holds the brake off and the brake clamps the motor armature and prevents rotation thereof. In operation, depending upon the particular balancing phase, fields 122 and 123 are energized through line 126 and the selected contacts M1, M2, CW, CCW, slip-ring assemblies 127 and 128 and a current path is completed back to line 129 which is common with ground.

The leads to the motor fields from slip-rings 128 are identified with contactor references M1, M2, CW, CCW to indicate which fields are energized by the relays M1, M2, CW and CCW during the various phases of operation.

It may thus be seen that the objects of the invention set forth above as well as those made apparent from the preceding description are efficiently attained. While preferred embodiments of the invention have been set forth for purposes of disclosure, other embodiments of the invention as well as modifications to the disclosed embodiments thereof may occur to those skilled in the art. Accordingly, the appended claims are intended to cover all embodiments of the invention and modifications thereof which do not depart from the spirit and scope of the invention.

What is claimed is:

1. A grinding wheel assembly comprising in combination a spindle, means mounting a grinding wheel on said spindle, balancing weights in the form of first and second motors, means defining annular paths of movement for said motors coaxial with the axis of said spindle on said wheel mounting means, each of said motors having shaft-mounted means for driving said motors in said paths, and means for energizing said motors to drive said motors about said axis.

2. A grinding wheel assembly comprising in combination a spindle, means mounting a grinding wheel on said spindle, balancing weights in the form of first and second motors, means mounting said motors on said spindle for rotative movement thereabout, each of said motors being arranged upon energization thereof to move in a fixed path about the axis of said spindle, and means for energizing said motors for rotation in selected directions.

3. The arrangement of claim 2 further including means for selecting the direction of rotation of said motors about the axis of said spindle.

4. The arrangement of claim 2 further including means for indicating if said motors come in contact.

5. The arrangement of claim 2 further including a slip-ring assembly on said spindle, means connecting the slip-rings on said assembly to windings of said motors and means for selectively energizing said windings through said slip-rings to control the direction of rotation of said motors.

6. The arrangement of claim 2 further including means for simultaneously energizing said motors and producing equiangular rotation thereof with respect to the axis of said spindle in a given interval of time.

7. The arrangement of claim 2 further including means for selectively energizing said motors to produce an unbalance vector therebetween in relation to the grinding wheel, and rotating said motors in unison in the same direction to rotate said produced vector.

8. A grinding wheel assembly comprising in combination a spindle, means mounting a grinding wheel on said spindle, balancing weights in the form of first and second motors, means defining annular paths of movement for said motors coaxial with the axis of said spindle on said wheel mounting means, said paths being on equal radii with respect to the axis of said spindle, each of said motors having shaft-mounted means for driving said motors in said paths, and means for energizing said motors to drive said motors about said axis.

9. A grinding wheel assembly comprising in combination a spindle, means mounting a grinding wheel on said spindle, balancing weights in the form of first and second motors, means mounting said motors on equal radii with respect to the axis of said spindle for rotative movement thereabout, each of said motors being arranged upon energization thereof to move in a fixed path about the axis of said spindle, and means for energizing said motors for rotation in selected directions.

10. A grinding wheel assembly comprising in combination a spindle, a collar on said spindle for mounting a grinding wheel thereon, said collar having a projecting hub portion having a generally cylindrical surface, a ring gear mounted to said collar for rotation therewith, said ring gear being coaxial with said spindle, first and second motors, bearing collars supporting said motors on said hub for rotative movement thereabout at equal radii from the axis of said spindle, each of said motors having a shaft-mounted pinion engaging said ring gear, and means for energizing said motors to cause said pinions to drive said motors around said hub.

11. The arrangement of claim 10 further including means for selecting the direction of rotation of said motors about the axis of said spindle.

12. The arrangement of claim 10 further including means for indicating if said motors come in contact.

13. The arrangement of claim 10 further including a slip-ring assembly on said spindle, means connecting the slip-rings on said assembly to windings of said motors and means for selectively energizing said windings through said slip-rings to control the direction of rotation of said motors.

14. The arrangement of claim 10 further including means for simultaneously energizing said motors and producing equiangular rotation thereof with respect to the axis of said spindle in a given interval of time.

15. The arrangement of claim 10 further including means for rotating said motors about the axis of said spindle to produce an unbalance vector therebetween in relation to the grinding wheel, and rotating said motors in unison in the same direction to rotate said produced vector.

16. A grinding wheel assembly comprising in combination a spindle, a collar on said spindle for mounting a grinding wheel thereon, said collar having a projecting hub portion having a generally cylindrical surface, a ring gear mounted to said collar for rotation therewith, said ring gear being coaxial with said spindle, first and second motors, bearing collars supporting said motors on said hub for rotative movement thereabout at equal radii from the axis of said spindle, each of said motors having a shaft-mounted pinion engaging said ring gear, and means for energizing said motors to cause said pinions to drive said motors around said hub, said motors residing within the outline of said collar.

17. A grinding wheel assembly comprising in combination a spindle, a collar on said spindle for mounting a grinding wheel thereon, said collar having a projecting hub portion having a generally cylindrical surface, a ring gear mounted to said collar for rotation therewith, first and second annular bearings coaxially mounted to said hub about said cylindrical surface, a first motor supported on said first bearing for movement thereon about the axis of said spindle, a second motor supported on said second bearing for movement thereon about the axis of said spindle, each of said motors having a pinion engaging said ring gear, and means for energizing said motors to cause said pinions to drive said motors around said hub.

References Cited

UNITED STATES PATENTS

| | | | |
|---|---|---|---|
| 1,876,527 | 9/1932 | Thearle et al. | 73—51 |
| 2,241,637 | 5/1941 | Ernst et al. | 51—169 X |
| 2,915,918 | 12/1959 | Comstock | 74—573 |
| 3,149,502 | 9/1964 | Caruso et al. | 74—573 |

LESTER M. SWINGLE, *Primary Examiner.*